(12) United States Patent
Kayama et al.

(10) Patent No.: US 6,825,284 B2
(45) Date of Patent: Nov. 30, 2004

(54) METHOD FOR PREPARING POLY-α-HYDROXYACRYLATE AQUEOUS SOLUTION

(75) Inventors: Ryuichi Kayama, Fukushima (JP); Toshio Suzuki, Fukushima (JP)

(73) Assignee: Nippon Peroxide Co., Ltd., Kawasaki (JP)

( * ) Notice: Subject to any disclaimer, the term of this patent is extended or adjusted under 35 U.S.C. 154(b) by 167 days.

(21) Appl. No.: 10/217,434

(22) Filed: Aug. 14, 2002

(65) Prior Publication Data

US 2003/0125455 A1 Jul. 3, 2003

(30) Foreign Application Priority Data

Aug. 27, 2001 (JP) .......................... 2001-255826
Jun. 20, 2002 (JP) .......................... 2002-179491

(51) Int. Cl.$^7$ .............................. C08G 63/06; C08J 3/07
(52) U.S. Cl. .................... 525/415; 525/369; 525/387
(58) Field of Search .................. 525/369, 387, 525/415

(56) References Cited

U.S. PATENT DOCUMENTS 3,169,946 A     2/1965  Minsk
4,182,806 A  *  1/1980  Vanlautem et al. ......... 525/369

FOREIGN PATENT DOCUMENTS

| DE | 2061584 | 7/1972 | | |
|---|---|---|---|---|
| DE | 195 21 695 | 12/1996 | | |
| FR | 2 388 833 | 11/1978 | | |
| JP | 54-5839 | 3/1979 | | |
| JP | 54-20995 | 7/1979 | | |
| JP | 2-296803 | 12/1990 | | |
| JP | 02296803 | * 12/1990 | ............. | C08F/8/12 |
| JP | 7-224111 | 8/1995 | | |
| JP | 07224111 | * 8/1995 | ............. | C08F/8/12 |

OTHER PUBLICATIONS

Derwent Abstracts, AN 1995–325563, XP–002223317, JP 07–224111, Aug. 22, 1995.
Derwent Abstracts, AN 1991–026333, XP–002223318, JP 02–296803, Dec. 7, 1990.
C.S. Marvel, et al., "Polymers of the Alpha–Haloacrylic and their Derivatives", Polymers of Alpha–Saloacrylic Acids, vol. 62, pp. 3495–3498.

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

A method for preparing a poly-α-hydroxyacrylate aqueous solution, which comprises reacting a polylactone compound corresponding to poly-α-hydroxyacrylic acid (hereinafter referred to as "PLAC") with an alkali, wherein the alkali is added dividedly.

13 Claims, No Drawings

METHOD FOR PREPARING POLY-α-HYDROXYACRYLATE AQUEOUS SOLUTION

The present invention relates to a method for preparing a poly-α-hydroxyacrylate aqueous solution, particularly a method for preparing a high concentration aqueous solution having a concentration of at least 25 wt % of poly-α-hydroxyacrylate.

A poly-α-hydroxyacrylate (hereinafter referred to as "PHA salt") represented by sodium poly-α-hydroxyacrylate is an industrially important material as a hydrogen peroxide bleaching stabilizer for paper pulp or fibrous materials, a detergent builder, a chelating agent, a surfactant and the like.

It is known that a PHA salt is obtained by reacting a polylactone compound corresponding to poly-α-hydroxyacrylic acid (hereinafter referred to as "PLAC") with a corresponding alkaline material. Also, a method for preparing PLAC is proposed in an article by C. S. Marvel (J.A.C.S. 62, page 3495, 1940), JP-B-54-5839 and JP-B-54-20995 by Solvay Co., or German Patent Application No. 2,061,584 by Henkel Co.

PLAC is a material generally represented by the following structural formula.

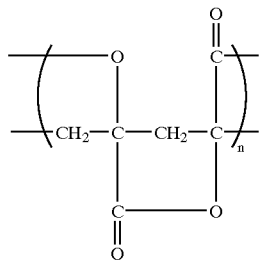

A PHA salt in the present invention has an average molecular weight in a range of from 2,000 to 1,000,000, particularly an average molecular weight of from 5,000 to 200,000, more particularly an average molecular weight of from 10,000 to 100,000. If the average molecular weight is less than 2,000, particularly less than 1,000, a performance of stabilizing by hydrogen peroxide can not be expected. For a performance as a bleaching stabilizer for paper pulp, an average molecular weight of from 30,000 to 60,000 is most suitable.

In order to convert PLAC into an aqueous solution of a PHA salt, it is heretofore known to place PLAC in an aqueous solution of corresponding alkaline substance to make reaction.

However, according to this method, it takes a long time for the placed PLAC to be dissolved as a PHA salt, and in order to obtain a high concentration PLA salt aqueous solution, a side-reaction is caused, and a critical problem of generating a decomposed product having a molecular weight of at most 1,000 is caused.

JP-A-2-296803 proposes a method for dispersing PLAC in water and adding an alkaline substance thereto, and according to this method, it requires a large amount of water to make a slurry of PLAC, and it is therefore difficult to obtain a PHA salt aqueous solution having a concentration of at least 25 wt %.

Accordingly, in order to obtain a high concentration product of at least 25 wt % by the above method, it was necessary to employ an unfavorable method in view of energy which requires concentration of a low concentration product.

JP-A-7-224111 proposes a method for reacting PLAC with an alkaline aqueous solution containing hydrogen peroxide in the synthesis of a poly-α-hydroxyacrylate aqueous solution by the reaction of PLAC with an alkali aqueous solution.

However, this method produces a very sticky material in the initial stage of adding PLAC, and the sticky material sticks to a stirring vane (hereinafter referred to as "sticking"), and provides a problem of causing a weight eccentricity of a stirring vane axis. If this method is carried out on an industrial scale, there is caused a serious problem of damaging a stirring vane axis, a bearing, a stirring motor or the like. Also, this method of using a total alkali amount in the initial stage has a defect of producing a PHAS having a relatively small molecular weight.

A problem to be solved by the present invention resides in a discovery of a stably operable method for obtaining a PHA salt aqueous solution having a high concentration of at least 25 wt % without a concentration step, without producing a by-product and without damaging a stirring machine.

Present inventors have intensively studied a preparation step of a poly-α-hydroxyacrylate aqueous solution and have discovered that a reaction can be stably carried out without causing "sticking" by initiating addition of PLAC with an addition of a part of a total addition amount of alkali in the initial stage and adding the remaining alkali on the halfway of the reaction, and the present invention was accomplished on the basis of this discovery.

Thus, the present invention relates to a method for preparing a poly-α-hydroxyacrylate aqueous solution which comprises a step of obtaining the poly-α-hydroxyacrylate aqueous solution by reacting a polylactone compound corresponding to poly-α-hydroxyacrylic acid (PLAC) with an alkali, characterized in that an alkali is dividedly added.

PLAC is a material represented by the above-mentioned structural formula, and its basic unit is expressed by the following formula (I), and a theoretical unit formula amount of PLAC is $C_3H_2O_2=70$. However, actually, a part having free —COOH and —OH groups as illustrated in the formula (II) ($C_3H_4O_3=88$) is about 1/3 of the total, and the remaining part having a lactone structure is about 2/3 of the total. Accordingly, the actual unit formula amount is calculated to be 76 (calculation formula: $70\times(2/3)+88\times(1/3)=76$), and in the method of the present invention, a unit formula amount of PLAC is calculated to be 76. Hereinafter, this unit formula amount of 76 is determined to be PLAC 1 mol for convenience when expressing a quantitative relationship with other materials added.

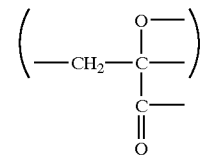
Formula (I)

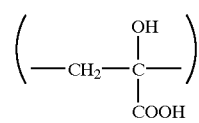
Formula (II)

A total amount of an alkali material to be added is from 0.5 to 1.7 times mol to the unit formula amount of PLAC, and an amount of an alkali material to be added in the initiation of reaction is adjusted in such a manner as to provide an alkali concentration in a range of from 1 to 12 wt % in the reaction system at the initial stage of reaction. The remaining alkali material is added dividedly or continuously during the dissolving reaction.

A reaction temperature is in a range of from 20 to 70° C.

Generally, PLAC is obtained as a water-insoluble wet cake by polymerizing α-halogenoacrylic acid in water. If necessary, it is possible to dry the cake to obtain a dry PLAC.

However, when a final product is obtained in a state of a PHA salt aqueous solution, it is generally not necessary to dry PLAC, and it is usual to use the wet cake in a succeeding step.

In the method of the present invention, PLAC may be either a dry product or a wet cake, but the wet cake is particularly advantageously usable in the present invention.

An alkali material used in the present invention is not specially limited, examples of which include inorganic alkalis such as sodium hydroxide, potassium hydroxide, sodium carbonate, sodium hydrogencarbonate or ammonia, organic alkali materials such as dimethylamine, diethylamine or diethanolamine, and the like. Particularly, sodium hydroxide is a typical example.

In the present invention, a method of conducting a reaction of PLAC and an alkali in the presence of hydrogen peroxide or a peroxide generating hydrogen peroxide is the most preferable embodiment which does not provide "sticking", produces substantially a colorless PHA salt aqueous solution, and produces a less by-product.

Hydrogen peroxide or a peroxide generating hydrogen peroxide in an aqueous solution is added in an amount of from 0.005 to 2.0 times mol (hydrogen peroxide conversion value in case of a peroxide) to a unit formula amount of PLAC, preferably from 0.01 to 0.1 time mol, more preferably from 0.015 to 0.07 time mol, to a unit formula amount of PLAC. If an amount of hydrogen peroxide is less than 0.005 time mol to a unit formula amount of PLAC, a product is colored (yellow) and a side-reaction is caused. Also, if an amount of hydrogen peroxide exceeds 2.0 times mol, it is uneconomical Hydrogen peroxide used in the present invention may be a usual industrial product, and its concentration is not limited but is preferably in a range of from 20 to 65%.

A peroxide generating hydrogen peroxide in an aqueous solution may be used as hydrogen peroxide. Examples of a peroxide generating hydrogen peroxide in an aqueous solution include sodium carbonate-hydrogen peroxide adduct (generally called as "sodium percarbonate"), urea-hydrogen peroxide adduct, sodium sulfate-sodium chloride-hydrogen peroxide adduct, sodium perborate, and the like. Among them, sodium carbonate-hydrogen peroxide adduct is a typical example.

These peroxides release hydrogen peroxide when dissolved in water, and achieve the same chemical function as hydrogen peroxide in the present invention. Accordingly, hereinafter, explanation is made with reference to hydrogen peroxide as a typical example.

In the method of the present invention, it is basic to place PLAC in an alkali aqueous solution to be dividedly added, and a by-product is produced in a large amount when this addition method is not followed.

When using hydrogen peroxide in the present invention, a basic method is to previously add hydrogen peroxide into an alkali aqueous solution, but it is possible to add hydrogen peroxide during the reaction. Also, it is possible to add hydrogen peroxide at the same time as adding PLAC. Further, it is possible to supply is hydrogen peroxide into the traction system by having a wet PLAC cake impregnated with hydrogen peroxide.

In the method of the present invention, it is very important how to add an alkali substance. A part of the total alkali addition amount is charged at the initial stage. At this stage, an amount of an alkali substance added is preferably adjusted so as to provide an initial alkali concentration in a range of from 1 to 12 wt %, more preferably from 2 to 10 wt %, most preferably from 3 to 9 wt %. If PLAC is added in such an amount as to provide an initial alkali concentration of exceeding 12 wt %, "sticking" is caused. On the other hand, if PLAC is added in such an amount as to provide an initial alkali concentration of less than 1 wt %, an aimed reaction does not proceed.

The total amount of an alkali substance added in the present invention is in a range of from 0.5 to 1.7 times mol, preferably from 0.9 to 1.20 times mol, more preferably from 0.95 to 1.1 times mol, to a unit formula amount of PLAC, but as mentioned above, an amount of an alkali substance added at the initial stage of reaction is adjusted in such an amount as to provide an alkali concentration in a range of from 1 to 12 wt % in the reaction system at the initial stage of dissolving reaction, and the remaining alkali substance is dividedly or continuously supplied during the dissolving reaction. In this step, a molar ratio of a PLAC supply amount and an alkali substance supply amount is adjusted so as to be alkali/PLAC=from 0.9/1 to 1.2/1 during from 0.5 to 4 hours.

The present reaction is a sort of neutralization reaction and is an exothermic reaction. During the step, a temperature range is preferably from 20to 70° C., more preferably from 30 to 60° C. For example, it is preferable to initiate the reaction at a temperature of 20 to 45° C., and to gradually raise the temperature, and finally to finish the reaction at a temperature in a range of from 50 to 70° C.

It is a convenient method for controlling an alkali concentration to divide PLAC and a total alkali substance respectively into n parts (n≧2) and to add an alkali substance and PLAC respectively in a 1/n amount into the reaction system. The number n is usually in a range of from 3 to 6, but it is possible to continuously supply an alkali substance and it is also possible to continuously supply PLAC through a feeder. When continuously supplying the materials, the number n becomes infinite.

For instance, the method of the present invention is explained by taking a method of dividing an alkali substance into three parts and adding the alkali substance dividedly as a typical example.

First, a predetermined amount of water and a 1/3 amount of an alkali substance are charged and stirred, and a 1/3 amount of PLAC prepared is then added over 1 hour. In this step, a temperature is controlled in a range of from 20 to 45° C. Next, another 1/3 amount of an alkali substance is added and another 1/3 amount of PLAC is added over 1 hour. In this step, a temperature is controlled in a range of from 40 to 55° C. Thereafter, a final 1/3 amount of an alkali substance is added and a final 1/3 amount of PLAC is added over 1 hour. At that time, the temperature is controlled in a range of from 50 to 70° C. After finishing the addition of PLAC, the temperature is maintained and stirring is continued to dissolve PLAC.

When hydrogen peroxide is added in this reaction, a predetermined amount of water and a 1/3 amount of an alkali substance are first charged and stirred, and a total amount of hydrogen peroxide is then added thereto.

The reaction between PLAC and an alkali substance is basically alkali hydrolysis of a lactone ring, but in a step of converting PLAC into a PHA salt, the reaction is a solid-liquid coexistent system, and since a concentrated PHA salt solution is transitionally formed on the surface of PLAC, the reaction is actually accompanied by a complicated phenomenon.

When PLAC is converted into a PHA salt, a part of lactone is subjected to hydrolysis on the halfway, and a lactone part and a carboxylate part coexist, and a viscosity of a high molecular solution side in the vicinity of the interface is higher than a viscosity of a PHA salt solution completely dissolved at a later stage, and when this highly viscous thin film-like material covers a solid surface of PLAC, contact between a liquid side and a solid side is remarkably impaired.

In a conventional method, an alkali concentration at the time of charging is very high, and consequently a partly dissolved PLAC provides a high viscosity and a high adhesiveness and accordingly "sticks" to a stirring vane.

Also, when PLAC is brought into contact with an alkali substance in an excessive alkali state, carboxylic acids (such as pyruvic acid or acetic acid) having a molecular weight of at most 1,000 are by-produced , and since the by-produced materials do not have a performance (such as a stabilizing function of hydrogen peroxide) as a PHA salt, they become a loss in a yield. The production of the by-products becomes particularly remarkable when a temperature is high and an alkali concentration is high.

Even in the absence of hydrogen peroxide, a method of dividedly adding an alkali produces a by-product in a less amount and provides a lower degree of coloring as compared with a case of charging an alkali first.

PLAC contains a chlorine compound such as NaCl as an impurity in view of its production step, and consequently some chlorine gas is generated when reacting with hydrogen peroxide. Therefore, an SUS-made container or a stirring apparatus is corroded depending on conditions. When hydrogen peroxide is brought into contact with PLAC at a low alkaline concentration state, a metal is sometimes corroded.

According to the method of the present invention, a stable operation can be made without "sticking" to a stirring vane, and without employing a step of concentrating and evaporating a water content which was conventionally carried out and is uneconomical in view of energy, it is possible to efficiently and directly obtain a PHA salt aqueous solution having a high concentration of at least 25 wt %, in which the production of a by-product is very low and a product is colorless.

EXAMPLES

Examples 1 to 5

95.7 g of water and 53.3 g of 25% NaOH were placed in a four-forked 500 ml flask equipped with a stirring vane, a thermometer and a condenser, and 2.43 g (0.025 mol, i.e. 0.025 time mol to PLAC) of 35% hydrogen peroxide was added thereto with stirring. At this point, an NaOH concentration (hereinafter referred to as initial NaOH concentration") was 8.80%. A mol ratio of NaOH at the time of charging was 0.33 to PLAC. (PLAC used was 109.0 g of a wet product having a pure content ratio of 69.7% (corresponding to 76.0 g of a pure amount to 1.0 unit formula amount).)

The addition of PLAC was carried out for 3 hours. The initiation of adding PLAC is determined to be the initiation time. An amount of 25% NaOH used was 160.0 g in total, and was a mol ratio of 1.00 to PLAC. Among the total amount of 160.0 g of 25% NaOH, a 1/3 amount (53.3 g) was used at the time of charging, and another 1/3 amount was added after 1 hour, and a final 1/3 amount was added after 2 hours. Each addition of NaOH was carried out in 5 minutes. During the dissolving reaction, a temperature control was carried out under such conditions as shown in Table 1. After finishing the addition of PLAC, post-stirring was carried out under such conditions as shown in Table 1 to dissolve PLAC. After finishing the dissolving reaction, the resultant product was subjected to HPLC analysis to determine a concentration of a by-product and a production ratio of the by-product was calculated. 5 g of the reaction liquid was placed in a Petri dish, and was dried at 105° C. for 3 hours to determine a solid content as a PHA salt concentration. A yellow color degree of the product thus obtained was determined by a color-difference meter.

A pH value of the reaction liquid was measured by a pH meter. Also, a Flory molecular weight was measured by a viscometer. Further, "sticking" to a stirring vane was visually observed and evaluated.

Example 6

96.3 g of water and 108.4 g (a pure content amount 76.0 g corresponding to 1.0 unit formula amount) of a PLAC wet product having a pure content ratio of 70.1% were used, and 160.0 g of 25% NaOH was divided into two parts, the first half amount of which was used at the time of charging and the second half amount of which was added after 1 hour. Other conditions were the same as in Example 1. The results are shown in the following Table 1.

Example 7

77.2 g of water and 10.7 g of 25% NaOH (a total amount of 25% NaOH was 128.0 g (corresponding to 1.0 time mol of PLAC) and 10.7 g of 25% NaOH corresponds to 0.084 time mol of PLAC) were placed in a four-forked 500 ml flask equipped with a stirring vane, a thermometer and a condenser, and 1.81 g (0.032 mol corresponding to 0.04 time mol of PLAC) of 25% hydrogen peroxide was added thereto with stirring. PLAC employed was 86.7 g of a wet product having a pure content ratio of 70.1% (a pure amount of 60.8 g corresponding to 0.8 unit formula amount). The addition of PLAC was carried out for 1 hour. The initiation point of adding PLAC was determined to be the initiation time. The remaining 25% NaOH 117.3 g was supplied by a pump at a constant rate for 1 hour at the same time as the initiation of adding PLAC. During the reaction, a temperature was controlled to 35° C. Post-stirring was carried out at 50° C. for 2 hours. Other conditions were the same as in Example 1.

Example 8

The same procedure as in Example 1 was repeated, except that 94.7 g of water was used without employing hydrogen peroxide. The reaction temperature was 35° C., and NaOH was added dividedly three times. The results are shown in Table 1.

Comparative Example 1

94.8 g of water and 160.0 g of 25% NaOH (corresponding to 1.0 time mol of PLAC) were charged into a tour-forked 500 ml flask equipped with a stirring vane, a thermometer and a condenser, and 3.89 g of 35% hydrogen peroxide (corresponding to 0.04 time mol of PLAC) was added thereto with stirring. The PLAC employed was 108.4 g of a wet product having a pure content ratio of 70.1% (a pure amount of 76.0 g corresponding to 1.0 unit formula amount). The addition of PLAC was carried out for 3 hours. During the reaction, a temperature was controlled to 40° C. Post-stirring was carried out at 50° C. for 2 hours. Other conditions were the same as in Example 1. When initiating the addition of PLAC, "sticking" to a stirring vane and a stirring axis was caused, and "sticking" to a temperature sensor was also caused. It was clearly observed with naked eyes that an eccentric load was applied to a stirring axis. Other results are shown in the following Table 1.

Comparative Example 2

The same procedure as in Comparative Example 1 was repeated, except hydrogen peroxide was not used. When initiating the addition of PLAC, "sticking" to a stirring vane and a stirring axis was caused, and it was clearly observed with naked eyes that an eccentric load was applied to a stirring axis. Other results are shown in the following Table 1.

TABLE 1

| | Initial | | | Results | | | | | |
|---|---|---|---|---|---|---|---|---|---|
| | NaOH concentration (%) | Reaction temperature (° C.) | Post-stirring | PHA salt concentration (%) | pH | Molecular weight | By-product production ratio (%) | Yellow color degree (%) | Evaluation of "sticking" *1 |
| Example No. | | | | | | | | | |
| 1 | 8.80 | 0–1 hr 30→45<br>1–2 hr 45→55<br>2–3 hr 55→60 | 60° C.<br>2 hr | 35.2 | 9.3 | 45,000 | 0.0 | 8 | ○ |
| 2 | 8.80 | 0–1 hr 30→45<br>1–2 hr 45→55<br>2–3 hr 55→65 | 65° C.<br>2 hr | 34.0 | 9.2 | 46,000 | 0.1 | 5 | ○ |
| 3 | 8.80 | 0–1 hr 30→45<br>1–2 hr 45→60<br>2–3 hr 60 | 60° C.<br>2 hr | 34.7 | 9.2 | 49,000 | 0.1 | 6 | ○ |
| 4 | 8.80 | 0–1 hr 30→50<br>1–2 hr 50→60<br>2–3 hr 60 | 60° C.<br>2 hr | 34.9 | 9.2 | 44,000 | 0.0 | 7 | ○ |
| 5 | 8.80 | 50 | 50° C.<br>2 hr | 36.8 | 9.0 | 48,000 | 0.1 | 4 | ○ |
| 6 | 11.19 | 35 | 50° C.<br>3 hr | 34.1 | 9.4 | 42,000 | 0.1 | 9 | ○ |
| 7 | 2.98 | 35 | 50° C.<br>2 hr | 34.9 | 9.0 | 60,000 | 0.1 | 9 | ○ |
| 8 | 9.00 | 35 | 50° C.<br>2 hr | 35.2 | 9.4 | 34,000 | 5.9 | 63 | ○ |
| Comparative Example | | | | | | | | | |
| 1 | 15.46 | 40 | 50° C.<br>2 hr | 34.1 | 9.3 | 29,000 | 0.1 | 8 | X |
| 2 | 15.70 | 40 | 50° C.<br>2 hr | 34.1 | 9.3 | 28,000 | 20.1 | 88 | X |

The entire disclosures of Japanese Patent Application No. 2001-255826 filed on Aug. 27, 2001 and Japanese Patent Application No. 2002-179491 filed on Jun. 20, 2002 including specifications, claims and summaries are incorporated herein by reference in their entireties.

What is claimed is:

1. A method for preparing a poly-α-hydroxyacrylate, which comprises reacting a polylactone compound corresponding to poly-α-hydroxyacrylic acid (hereinafter referred to as "PLAC") with an alkali to produce a poly-α-hydroxyacrylate aqueous solution having a concentration of at least 25 wt %,
wherein the alkali is added in multiple addition steps.

2. The method according to claim 1, wherein the alkali is added in multiple addition steps at the initiation of the reaction and during the reaction.

3. The method according to claim 1, wherein the alkali is added in such a manner as to provide an alkali concentration of from 1 to 12 wt % in the reaction system at the initiation of the reaction.

4. The method according to claim 1, wherein the reaction is carried out in the presence of hydrogen peroxide or a peroxide generating hydrogen peroxide in an aqueous solution.

5. The method according to claim 1, wherein the PLAC is added to an alkali aqueous solution.

6. The method according to claim 1, wherein a total addition amount of the alkali is from 0.5 to 1.7 times mol amount to a unit formula amount of PLAC.

7. The method according to claim 4, wherein the hydrogen peroxide or the peroxide generating hydrogen peroxide in an aqueous solution is added in a total amount of from 0.005 to 2.0 times mol to a unit formula amount of PLAC.

8. The method according to claim 1, wherein a reaction temperature is in a range of from 20 to 70° C.

9. The method according to claim 1, wherein the total PLAC and the total alkali are respectively divided into n parts (n≧2), and the PLAC and the alkali are added to the reaction system respectively in a 1/n amount.

10. The method according to claim 9, wherein n is 3.

11. The method according to claim 8, wherein the reaction is initiated at a temperature of 20 to 45° C., and the temperature is slowly raised, and the reaction is finished at a temperature of 50 to 70° C.

12. The method according to claim 10, wherein a reaction temperature of the first 1/3 amount is in a range of from 20 to 45° C., and a reaction temperature of the second 1/3 amount is in a range of from 40 to 55° C., and a reaction temperature of the last 1/3 amount is in a range of from 50 to 70° C.

13. The method according to claim 12, wherein a time required for adding each 1/3 amount of PLAC is in a range of from 0.5 to 3 hours.

* * * * *